(12) United States Patent
Lee et al.

(10) Patent No.: US 11,410,358 B2
(45) Date of Patent: Aug. 9, 2022

(54) SYSTEM SUITABLE FOR EFFICIENT COMMUNICATION OF MEDIA STREAM AND A METHOD IN ASSOCIATION THEREWITH

(71) Applicant: Creative Technology Ltd, Singapore (SG)

(72) Inventors: Teck Chee Lee, Singapore (SG); Darran Nathan, Singapore (SG); Shin Yee Chung, Singapore (SG); Yuan Yeow Leow, Singapore (SG)

(73) Assignee: Creative Technology Ltd, Singapore (SG)

( * ) Notice: Subject to any disclaimer, the term of this patent is extended or adjusted under 35 U.S.C. 154(b) by 0 days.

(21) Appl. No.: 16/432,191

(22) Filed: Jun. 5, 2019

(65) Prior Publication Data

US 2019/0306217 A1 Oct. 3, 2019

Related U.S. Application Data

(63) Continuation of application No. 14/294,898, filed on Jun. 3, 2014, now abandoned.

(30) Foreign Application Priority Data

Jan. 3, 2014 (SG) .............................. 201400088-9

(51) Int. Cl.
*H04N 21/478* (2011.01)
*G06T 11/60* (2006.01)
(Continued)

(52) U.S. Cl.
CPC .............. *G06T 11/60* (2013.01); *A63F 13/20* (2014.09); *A63F 13/31* (2014.09); *A63F 13/40* (2014.09);
(Continued)

(58) Field of Classification Search
CPC .................................................. H04N 21/4781
See application file for complete search history.

(56) References Cited

U.S. PATENT DOCUMENTS 6,307,567 B1 * 10/2001 Cohen-Or ............... G06T 15/10
345/473
7,092,554 B2 8/2006 Chen et al.
(Continued)

FOREIGN PATENT DOCUMENTS

EP 1391226 A1 2/2004
JP 09-081772 A 3/1997
(Continued)

OTHER PUBLICATIONS

Doenges P K et al: "Audio/video and synthetic graphics/audio for mixed media", Signal Processing. Image Communication. Elsevier Science Publishers, Amsterdam, NL, vol. 9, No. 4, May 1, 1997, pp. 443-463.

*Primary Examiner* — Michael H Hong
(74) *Attorney, Agent, or Firm* — Russell Swerdon; Desmund Gean (57) ABSTRACT

A method for replicating a media stream generated by a transmitter device. The method can include communicating world context generated at the transmitter device and processing the received world context. The generated world context is associable with description generated based on an application being run at the transmitter device. The generated world context can be based upon to generate the media stream in a manner such that description of the generated media stream can be associated with the description generated based the application being run. Processing of the received world context can be in a manner so as to replicate the media stream generated at the transmitter device. Description of the replicated media stream can correspond to the description of the media stream at the transmitter device.

(Continued)

The received world context can be further processed in a manner so as to change the description associable with the replicated media stream.

10 Claims, 5 Drawing Sheets (51) Int. Cl.
    *A63F 13/52*     (2014.01)
    *A63F 13/54*     (2014.01)
    *A63F 13/60*     (2014.01)
    *A63F 13/31*     (2014.01)
    *A63F 13/40*     (2014.01)
    *H04L 65/60*     (2022.01)
    *H04L 65/65*     (2022.01)
    *H04L 67/56*     (2022.01)
    *H04N 21/235*     (2011.01)
    *H04N 21/266*     (2011.01)
    *H04N 21/2662*     (2011.01)
    *H04N 21/44*     (2011.01)
    *H04N 21/462*     (2011.01)
    *H04N 21/854*     (2011.01)
    *A63F 13/20*     (2014.01)
    *G06F 3/16*     (2006.01)

(52) U.S. Cl.
    CPC .............. *A63F 13/52* (2014.09); *A63F 13/54* (2014.09); *A63F 13/60* (2014.09); *G06F 3/165* (2013.01); *H04L 65/605* (2013.01); *H04L 65/608* (2013.01); *H04L 67/28* (2013.01); *H04N 21/235* (2013.01); *H04N 21/2662* (2013.01); *H04N 21/26603* (2013.01); *H04N 21/44* (2013.01); *H04N 21/4621* (2013.01); *H04N 21/854* (2013.01); *A63F 2300/209* (2013.01); *H04N 21/4781* (2013.01)

(56) References Cited

U.S. PATENT DOCUMENTS

| | | | |
|---|---|---|---|
| 7,916,147 | B2 | 3/2011 | Clemie et al. |
| 2002/0082077 | A1* | 6/2002 | Johnson .................. A63F 13/58 463/30 |
| 2005/0090302 | A1 | 4/2005 | Campbell et al. |
| 2009/0054140 | A1 | 2/2009 | Beser et al. |
| 2010/0033427 | A1 | 2/2010 | Marks et al. |
| 2010/0227685 | A1* | 9/2010 | Mori ..................... A63F 13/335 463/30 |
| 2010/0234106 | A1 | 9/2010 | Kojima et al. |
| 2013/0172079 | A1* | 7/2013 | Ivanov .................... A63F 13/57 463/31 |
| 2013/0316828 | A1 | 11/2013 | Ur et al. |
| 2013/0344940 | A1 | 12/2013 | Kurabayashi et al. |
| 2013/0344960 | A1 | 12/2013 | Perry et al. |
| 2014/0375683 | A1 | 12/2014 | Salter et al. |

FOREIGN PATENT DOCUMENTS

| | | |
|---|---|---|
| JP | 2010-097460 A | 4/2010 |
| WO | 2004049607 A1 | 6/2004 |

* cited by examiner

SYSTEM SUITABLE FOR EFFICIENT COMMUNICATION OF MEDIA STREAM AND A METHOD IN ASSOCIATION THEREWITH

CROSS-REFERENCE TO RELATED APPLICATION

This application is a continuation of U.S. patent application Ser. No. 14/294,898, filed 3 Jun. 2014 and entitled "SYSTEM SUITABLE FOR EFFICIENT COMMUNICATION OF MEDIA STREAM AND A METHOD IN ASSOCIATION THEREWITH", which claims the benefit of priority from Singapore Patent Application 201400088-9, filed 3 Jan. 2014 and entitled "A SYSTEM SUITABLE FOR ONE OR BOTH OF AUDIO PROCESSING AND GRAPHICS PROCESSING AND A METHOD OF PROCESSING IN ASSOCIATION THEREWITH", the entirety of which are incorporated by reference for all purposes.

FIELD OF INVENTION

The present disclosure generally relates to a system suitable for efficiently communicating a media stream generated and a method in association with the system.

BACKGROUND

Generally, an electronic device would require an application programming interface (API) for the purpose of rendering audio, two dimensional (2D) graphics and/or three dimensional (3D) graphics. Open Graphics Library (hereinafter "OpenGL®") is one such example. OpenGL® is currently an industry standard for computer graphics with defined APIs which is supported by hardware vendors and which is commonly used by software programmers.

Rendered audio, 2D graphics and/or 3D graphics can be communicated from the electronic device (i.e., a source) to one or more recipients (i.e., receivers). A common example is sharing of a video (which includes audio, 2D graphics and/or 3D graphics) between friends via a common video sharing platform on internet.

Figure 1:
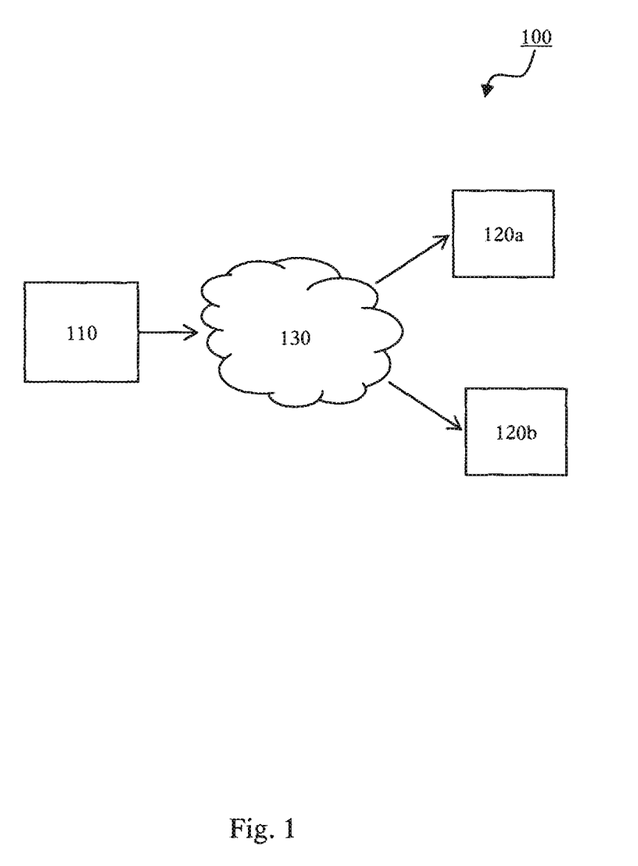
FIG. 1 shows a typical communication system in association with communication of information.

For example, referring to FIG. 1, a typical communication system 100 in association with communication of information is shown. As shown, information such as a video can be transmitted from a source 110 to one or more recipients 120a, 120b via an internet network 130. The video itself is uploaded onto the internet network 130 and can be accessed (e.g., downloaded) by a recipient 120a/120b via the internet network 130.

Therefore, conventional information sharing techniques (e.g., uploading a video) to share, for example, a video generated at a source 110 to one or more recipients 120a/120b require the source 110 to communicate the video itself to one or more recipients 120a/120b. Communication of video would require substantial resources (e.g., communication bandwidth) since a video typically has a large data size. Moreover, communication speed (e.g., upload and/or download speed) may be adversely affected depending on data size of the video.

Moreover, user enjoyment (i.e., recipient(s)) of the video may be limited since the manner in which a recipient can adjust the video per user preference is limited.

For example, a recipient may be able to change view of the video from partial screen view to full screen view. However, in doing so, pixellation may occur if the video generated at the source 110 is not meant (e.g., due to resolution) for full screen view at the receiving end (i.e., recipient(s) 120a/120b).

Appreciably, conventional information sharing techniques do not facilitate communication of information (e.g., video) in an efficient manner and/or user interaction with communicated information (e.g., video) in a user friendly manner.

It is therefore desirable to provide a solution to address at least one of the foregoing problems.

SUMMARY OF THE INVENTION

In accordance with an embodiment of the disclosure, there is provided a method for replicating a media stream generated by a transmitter device. The method can include communicating world context generated at the transmitter device and processing the received world context.

Specifically, the world context can be communicated from the transmitter device. Additionally, the generated world context can be associated with description generated based on an application being run at the transmitter device.

The generated world context can be based upon to generate the media stream in a manner such that description of the generated media stream can be associated with the description generated based on the application being run.

Processing of the received world context can be in a manner so as to replicate the media stream generated at the transmitter device. The replicated media stream can be associated with a description. The description of the replicated media stream can correspond to the description of the media stream at the transmitter device.

Moreover, the received world context can be further processed in a manner so as to change the description associable with the replicated media stream.

BRIEF DESCRIPTION OF THE DRAWINGS

Embodiments of the disclosure are described hereinafter with reference to the following drawings, in which.

DETAILED DESCRIPTION

Representative embodiments of the disclosure, for addressing one or more of the foregoing problems, are described hereinafter with reference to FIG. 2 to FIG. 5.

Figure 2:
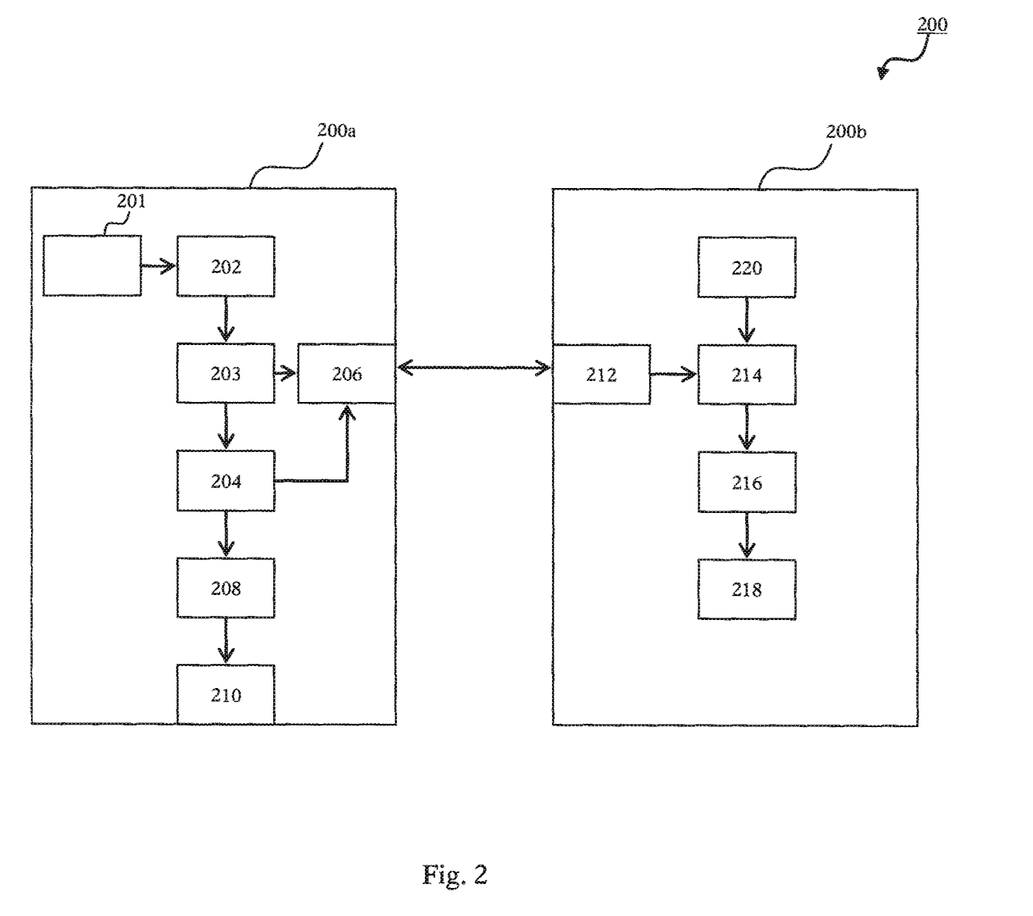
FIG. 2 shows a system which includes a transmitter device and a receiver device, in accordance with an embodiment of the disclosure.

FIG. 2 shows a system 200 in accordance with an embodiment of the disclosure. The system 200 can include a transmitter device 200a and a receiver device 200b. The transmitter device 200a can be coupled to the receiver device 200b. In one embodiment, the system 200 can be a computer, and the transmitter and receiver devices 200a/200b can be components of the computer. In another embodiment, each of the transmitter device 200a and the receiver device 200b can be a computer in the system 200.

In yet another embodiment, the transmitter device 200a and the receiver device 200b can be a computer in the system 200.

Preferably, each of the transmitter device 200a and the receiver device 200b can be suitable for one or both of audio processing and graphics processing. More specifically, each of the transmitter device 200a and the receiver device 200b can be suitable for processing and/or generating media stream such as video.

The transmitter device 200a and the receiver device 200b can be configured to signal communicate with each other. Signal communication between the transmitter device 200a and the receiver device 200b can, for example, be based on one or both of wired communication and wireless communication.

The transmitter device 200a can, in one embodiment, include an input module 201, an applications module 202, a buffer module 203 and a processor module 204. The transmitter device 200a can, in another embodiment, further include a transceiver module 206, a driver module 208 and an output module 210.

The receiver device 200b can, in one embodiment, include a transceiver portion 212, a processor portion 214, a driver portion 216 and an output portion 218. The receiver device 200b can, in another embodiment, further include an input portion 220.

As shown, in regard to the transmitter device 200a, the input module 201 can be coupled to the applications module 202 and the applications module 202 can be coupled to the buffer module 203. Additionally, the processor module 204 can be coupled to the buffer module 203. Moreover, the processor module 204 can be coupled to the driver module 208. Furthermore, the driver module 208 can be coupled to the output module 210. Yet furthermore, the transceiver module 206 can be coupled to one or both of the buffer module 203 and the processor module 204. As an option (not shown), the input module 201 can be coupled to the processor module 204.

In regard to the receiver device 200b, the transceiver portion 212 can be coupled to the processor portion 214, the processor portion 214 can be coupled to the driver portion 216 and the driver portion 216 can be coupled to the output portion 218. Additionally, the input portion 220 can be coupled to the processor portion 214.

Input signals can be generated by a user using the input module 201. The input signals can be communicated to the applications module 202 which can produce application signals based on the input signals. As an option, as will be discussed later in further detail with reference to FIG. 3, input signals can be communicated to the processor module 204 to generate one or more assets.

The application signals can subsequently be processed in a manner so as to produce media stream which can be one or both of audibly and visually perceived using the output module 210 as will be discussed in further detail hereinafter.

As mentioned, the applications module 202 can be configured to generate application signals. The application signals can be communicated from the applications module 202 to the buffer module 203.

The buffer module 203 can be configured to capture/store the application signals and further communicate the application signals to one or both of the transceiver module 206 and the processor module 204. More specifically, the buffer module 203 can be configured to capture/store the application signals and pass along (i.e., further communicate) the application signals without substantially modifying/altering the application signals.

The processor module 204 can be configured to process the application signals in a manner so as to produce control signals. The processor module 204 can be further configured to communicate the control signals to the driver module 208.

The processor module 204 can optionally be configured to process the input signals to generate assets. The processor module 204 can optionally be further configured to communicate the generated assets to one or both of the transceiver module 206 and the driver module 208. This will be discussed later in further detail with reference to FIG. 3.

The transceiver module 206 can be configured to further communicate the application signals to the transceiver portion 212 as will be discussed later in further detail. As an option, the transceiver module 206 can be configured to further communicate the generated assets to the transceiver portion 212 as will be discussed later in further detail.

The driver module 208 can be configured to receive and process the control signals to produce driver signals as will be discussed later in further detail with reference to FIG. 3. The driver module 208 can be further configured to communicate the driver signals to the output module 210.

The output module 210 can be configured to receive and process the driver signals. Based on the driver signals, the output module 210 can be configured to produce output signals which can be one or both of audibly perceived and visually perceived. The output signals can correspond to a media stream such as video. Specifically, output signals can correspond to a media stream (e.g., video) which can be associated with one or both of graphics based signals and audio based signals which can, correspondingly, be one or both of visually and audibly perceived.

Earlier mentioned, the transmitter device 200a and the receiver device 200b can be configured to signal communicate with each other. Further earlier mentioned, the transceiver module 206 can be configured to further communicate the application signals and/or generated asset(s) to the transceiver portion 212.

In this regard, the transceiver module 206 can be coupled (e.g., one or both of wired coupling and wireless coupling) to the transceiver portion 212. The transmitter device 200a and the receiver device 200b can be configured to signal communicate with each other via the transceiver module 206 and the transceiver portion 212.

The transceiver portion 212 can be configured to further communicate one or both of the received application signals and received asset(s) to the processor portion 214 for further processing.

The processor portion 214 can be configured to process the received application signals and/or received asset(s) in a manner so as to produce control signals. The processor portion 214 can be further configured to communicate the control signals to the driver portion 216.

The driver portion 216 can be configured to receive and process the control signals to produce driver signals. The driver portion 216 can be configured to communicate the driver signals to the output portion 218.

The output portion 218 can be configured to receive and process the driver signals. Based on the driver signals, the output portion 218 can be configured to produce output signals which can be one or both of audibly perceived and visually perceived. The output signals can correspond to a media stream such as video.

As the output signals produced by the output module 210 can be based on the application signals and output signals produced by the output portion 218 can be based on the received application signals, it is appreciable that the media stream generated at the transmitter device 200a side can be substantially replicated at the receiver device 200b side. In this regard, the media stream generated at the receiver device 200b can correspond to a replicated version of the media stream generated at the transmitter device 200a side. Specifically, based on application signals communicated from the transmitter device 200a to the receiver device 200b, a media stream generated at the transmitter device 200a can be substantially replicated (i.e., replicated media stream) at the receiver device 200b. Replication (i.e., at the receiver device 200b) of the generated media stream (i.e., at the transmitter device 200a) can relate to re-rendering, at the receiver device 200b, of the aforementioned graphics based signals and/or audio based signals associated with the media stream generated at the transmitter device 200a.

Since media stream generated at the transmitter device 200a is not communicated to the receiver device 200b per se, there is no need to dedicate substantial resources (e.g., communication bandwidth) for the purpose of sharing the generated media stream. The media stream generated at the transmitter device 200a can simply be replicated at the receiver device 200b based on the received application signals. The application signals/received application signals can correspond to commands for generating media stream/replicating media stream. It is appreciable that commands for generating media stream are substantially smaller in terms of data size compared to the generated media stream.

Earlier mentioned, conventional information sharing techniques to share a video generated at a source to one or more recipients require the source to communicate the video itself to one or more recipients. Communication of the video would require substantial resources (e.g., communication bandwidth) since a video typically has a large data size. Moreover, communication speed may be adversely affected depending on data size of the video.

It is therefore appreciable that for the system 200, by communicating commands instead of generated media stream (i.e., from the transmitter device 200a to the receiver device 200b), substantial resources need not be dedicated (as compared to conventional information sharing techniques) by virtue of the reduction in data size that needs to be communicated. Moreover communication speed need not be adversely impacted since communicated commands are generally much smaller in data size as compared to the generated media stream. In this regard, efficient communication can be facilitated.

As an option, the input portion 220 can be configured to generate (by, for example, a user) and communicate input signals to the processor portion 214. The processor portion 214 can be configured to process the input signals and the received application signals (and, optionally, received asset(s)) to produce control signals.

Therefore, it is possible for a user operating the receiver device 200b to flexibly modify/change any portion/part of the replicated media stream per user preference. Modification/change can be in relation to one or both of visual and audio. This will be discussed in further detail with reference to FIG. 3.

Appreciably, the input module 201, the processor module 204, the transceiver module 206, the driver module 208 and the output module 210 can be analogous to the input portion 220, the processor portion 214, the transceiver portion 212, the driver portion 216 and the output portion 218 respectively.

The system 200 will be discussed in further detail with reference to FIG. 3 hereinafter.

Figure 3:
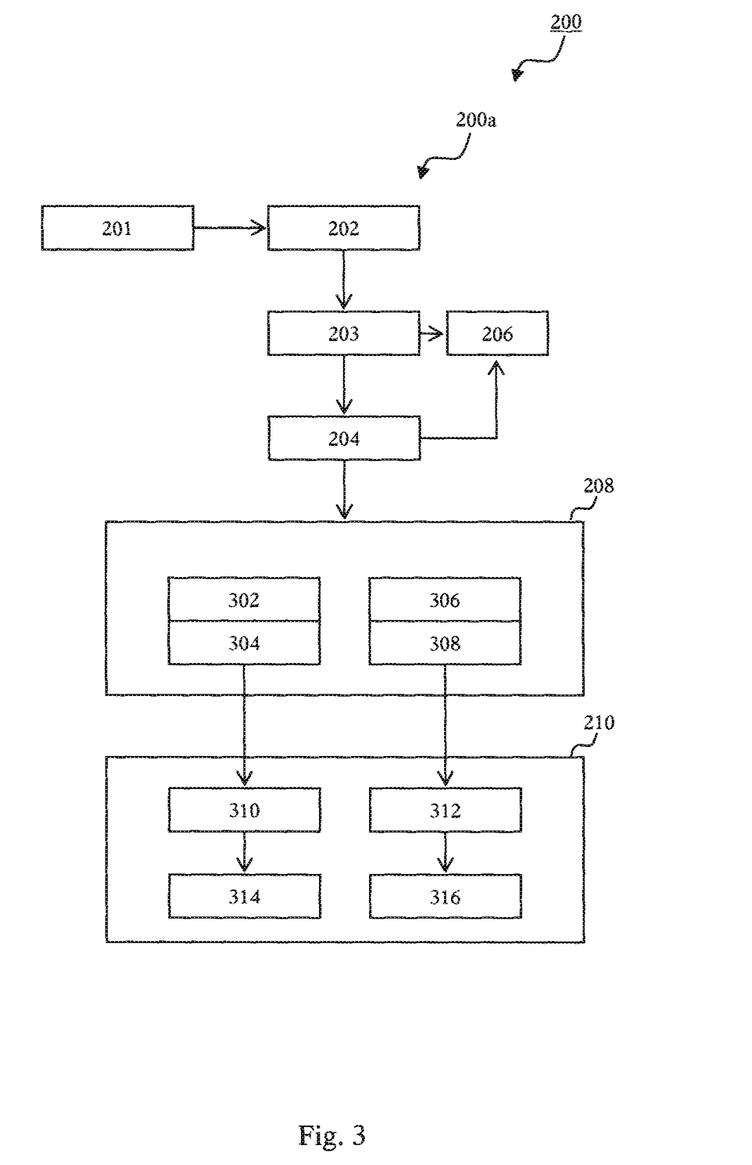
FIG. 3 shows, in further detail, the transmitter device of FIG. 2, in accordance with an embodiment of the disclosure.

FIG. 3 shows the system 200 in further detail, in accordance with an embodiment of the disclosure. In particular, the transmitter device 200a is shown in further detail, in accordance with an embodiment of the disclosure.

As shown, the driver module 208 can include an audio application programming interface (API) portion 302, an audio driver portion 304, a graphics API portion 306 and/or a graphics driver portion 308. Specifically, the driver module 208 can include one or both of an audio API portion 302 and a graphics API portion 306. The driver module 208 can further include one or both of an audio driver portion 304 and a graphics driver portion 308. The output module 210 can include one or both of an audio processing unit (APU) portion 310 and a graphics processing unit (GPU) portion 312. The output module 210 can further include one or both of an audio reproduction portion 314 and a display portion 316.

The audio API portion 302 can be coupled to the audio driver portion 304 and the graphics API portion 306 can be coupled to the graphics driver portion 308. The audio driver portion 304 can be coupled to the APU portion 310 and the graphics driver portion 308 can be coupled to the GPU portion 312. The APU portion 310 can be coupled to the audio reproduction portion 314 and the GPU portion 312 can be coupled to the display portion 316.

The audio API portion 302 and graphics API portion 306 can be associated with an audio library and a graphics library respectively. The audio library can include a collection of audio files such as MP3 based audio files or a collection of audio streams. The graphics library can include a collection of graphics files/pictures files/clips. The audio library and the graphics library can each be regarded as a standard library having a standard collection (e.g., of audio files and/or graphics files/pictures files/clips).

If a non-standard element (e.g., an audio file and/or a graphics file not available in the standard collection) is desired, one or more assets can be generated based on input signals (i.e., from the input module 201) communicated to the processor module 204. Therefore, an asset can, for example, correspond to a customized audio file and/or a customized graphics file not available in the audio library and/or graphics library. The generated asset(s) can be communicated from the processor module 204 to one or both of the transceiver module 206 for further communication to the receiver device 200b and driver module 208 for addition to the standard library.

Earlier mentioned, the driver module 208 can be configured to receive and process the control signals to produce driver signals. Particularly, the audio API portion 302 and the audio driver portion 304, in combination, can be configured to receive and process the control signals to produce audio driver signals. The graphics API portion 306 and the graphics driver portion 308, in combination, can be configured to receive and process the control signals to produce graphics driver signals.

More specifically, based on control signals received by the driver module 208, appropriate selection(s) from one or both of the audio library and the graphics library can be made. Based on the selection(s) made, one or both of audio and graphics driver signals can be generated. For example, the audio driver signals can be based on one or more audio files from the audio library and the graphics driver signals can be based on one or more graphics files/clips from the graphics library. Therefore the application signals can effectively be considered to be commands for making appropriate selection(s) from the audio library and/or the graphics library.

The output module 210 can be configured to receive and process one or both of the audio and graphics driver signals to produce output signals. Therefore, output signals can include one or both of audio output signals and graphics output signals.

Particularly, the APU portion 310 and audio reproduction portion 314 can, in combination, be configured to receive and process the audio driver signals to produce audio output signals. The GPU portion 312 and the display portion 316 can, in combination, be configured to receive and process the graphics driver signals to produce graphics output signals.

The output signals can, for example, correspond to a media stream which can be suitable for user perception. Particularly, the media stream can, for example, include audio output signals which can be audibly perceived and/or graphics output signals which can be visually perceived. The audio output signals can correspond to the aforementioned audio based signals and the graphics output signals can correspond to the aforementioned graphics based signals.

In this regard, the audio reproduction portion 314 can, for example, correspond to one or more speaker units. The display portion 316 can, for example, correspond to a display unit. In one example, the audio reproduction portion 314 can include a left speaker unit and a right speaker unit. The left and right speaker units can be located at the left side of the display unit and at the right side of the display unit respectively. Additionally, the display unit can, for example, be a touch screen based display or a stereoscopic liquid crystal display (LCD).

Earlier mentioned, the input module 201, the processor module 204, the transceiver module 206, the driver module 208 and the output module 210 can be analogous to the input portion 220, the processor portion 214, the transceiver portion 212, the driver portion 216 and the output portion 218 respectively.

Hence, although not shown in FIG. 3, the foregoing discussion regarding further details of the driver module 208 and the output module 210 can analogously apply to the driver portion 216 and the output portion 218 respectively.

Operationally, the applications module 202 may, for example, be running an application software or application program. The application software/program being run can correspond to, for example, a game based application. Therefore, the application software/program can be associable with one or both of visually and audibly perceivable output (i.e., via the output module 210).

The system 200 will be discussed in further detail hereinafter in the context of the applications module 202 running, for example, a game based application. The game based application can correspond to an electronic game which can be played by a user using, for example, the transmitter device 200a.

Usually, in a game, there will be one or more game characters and one or more game environments (i.e., scene setting) which can be visually perceived via the display portion 316. In the game, there can be a storyline or game rules and a gamer can play the game in accordance with the storyline or game rules. For example, there may be a need for the gamer to move one or more game characters in a game environment so as to achieve a certain objective. Appreciably, in a game, there can be one or more movable game characters and/or one or more stationary game characters. The movable game character(s) can be moved in accordance with gamer control to achieve a certain objective in the game. Furthermore, the game can include accompanying game audio such as background music, soundtracks and/or sound effects which can be audibly perceived via the audio reproduction portion 314.

For example, in a bowling game, the game characters can include a bowler, a bowling ball and a plurality of bowling pins. The game environment can be a bowling alley. In this regard, the movable game characters can be the bowler and the bowling ball. The stationary game characters can be the bowling pins. The game objective can be to knock down the bowling pins using the bowling ball and the game rules can correspond to real life bowling rules. In this regard, based on gamer control, the bowler and the bowling ball can be moved in a manner so as to knock down as many bowling pins as possible. The game audio can be the sound effect of a bowling ball knocking bowling pins down as the bowling ball contacts the bowling pins (i.e., collision).

Therefore, the game based application can be associated with game data which also can be referred to as application data. Game data (i.e., application data) can be communicated from the applications module 202 to the buffer module 203. In this regard, game data (i.e., application data) can correspond to the aforementioned application signals.

Moreover, game data can, for example, be associated with one or more game characters and/or one or more game environments. The game data can, for example, be further associated with game audio.

With regard to game audio, game data can include/be associated with audio accompaniment data. Audio accompaniment data can be associated with sound effects data, background music data and/or soundtrack data in relation, respectively, to the aforementioned sound effects, background music and/or soundtracks. Audio accompaniment data can further be associated with timing data. Timing data can relate to a specific instance/specific instances in the game when a certain audio file/certain audio files/audio stream(s) is/are played/accessed.

With regard to game character(s), game data can include/be associated with one or both of object data corresponding to the aforementioned game character(s). The object data can be associated with several objects. Of the several objects, there could be one or more objects of interest. The remaining objects (i.e., aside the one or more objects of interest) can be considered secondary objects. In this regard, object data can be associated with one or both of object(s) of interest and secondary object(s). In the context of the example of the bowling game, an object of interest can be the bowling ball and the secondary objects can be the bowling pins.

With regard to game environment(s), game data can include/be associated with scene data corresponding to the aforementioned game environment(s). In general, scene data can be associated with visually perceivable background/backdrop/scene depicting the scene setting relevant to the game. In the context of the example of the bowling game, the game environment relate to, for example, the bowling alley and/or a bowling lane in the bowling alley.

The object data can be associated with object description(s) and scene data can be associated with scene description(s). Each of the object description(s) and scene description(s) can, for example, be associated with vertex data, shape data, texture data and color data or any combination thereof.

Vertex data can be used as a basis for identification of movement and/or location as will be discussed later in further detail.

Texture data can be associated with appearance and/or perceived tactile quality of a surface. Specifically, texture data can be associated with, for example, surface type of the game character(s) (e.g., the bowling ball) and/or other objects in the game environment (e.g., the bowling lane). For example, texture data can be associated with whether the surface type of a game character(s) or an object in the game environment is reflective, shiny or non-reflective (e.g., the bowling ball has a glittering type surface/the bowling lane has a matt wood type surface).

Color data can be associated with visually perceivable color. Specifically, color data can be associated with color of the game character(s) (e.g., the bowling ball) and/or other objects in the game environment (e.g., the bowling lane). For example, the color data can be indicative that the bowling ball is yellow in color and/or the bowling lane is brown in color.

Shape data can be associated with perceived outline/form. Specifically, shape data can be associated with/indicative of, for example, shape of the game character(s) (e.g., geometric shape of the bowling ball, bowling pins) and/or shapes of other objects in the game environment.

Appreciably, since driver signals can be generated based on the control signals and the control signals can be generated based on the game data, the game data can effectively be considered to be commands for making appropriate selection(s) from the audio library and/or the graphics library.

In one example, an audio file can be selected from the audio library based on audio accompaniment data. Therefore based, effectively, on audio accompaniment data, audio driver signals can be generated.

In another example, a graphics file can be selected from the graphics library based on object data and/or scene data. Therefore based, effectively, on object data and/or scene data, graphics driver signals can be generated.

Earlier mentioned, input signals can be communicated from the input module 201 to the applications module 202. The input signals can be based on the aforementioned gamer control.

Further earlier mentioned, application signals can be generated based on the input signals. Since application signals can be generated by the applications module 202 based on the input signals, it can be appreciated that the input signals can effectively affect visual and/or audio output at the output module 210 (i.e., affect visual and/or audible perception of the media stream).

The manner in which input signals can effectively affect audio output at the output module 210 will be discussed later in further detail. The manner in which input signals can effectively affect visual output at the output module 210 will now be discussed in further detail.

In an example where the applications module 202 is running a game based application and the application signals can correspond to game data, input signals (i.e., gamer control) can be communicated from the input module 201 to the applications module 202 for, for example, moving an object of interest. Based on the input signals, the applications module 202 can produce game data corresponding to, for example, movement of the object of interest. Control signals generated by the processor module 204 can thus be based at least on movement of object of interest. Based on the control signals, an appropriate selection can be made from the graphics library to produce corresponding graphics driver signals. Based on the driver signals communicated to the output module 210, output signals corresponding to a media stream showing (i.e., visually perceivable) an object of interest moving can be produced. Therefore visual perception at the output module 210 can be affected depending on the input signals.

Earlier mentioned, vertex data can be used as a basis for identification of movement and/or location. Specifically, the processor module 204 can be configured to process the vertex data of the object of interest in a manner so as to identify location of the object of interest as it moves. For example, the processor module 204 can be configured to process the vertex data of the object of interest so as to identify the location of the object of interest on the display unit (i.e., onscreen). Specifically, the processor module 204 can be configured to process the vertex data of the object of interest so as to identify the initial location of the object of interest, the location(s) of the object of interest as it moves and the end location of the object of interest after it stops moving (i.e., comes to rest).

Since game data can, for example, be associated with one or more game characters, one or more game environments and/or game audio, visual and/or audio perception can be affected by the input signals in other ways apart from the above example of movement of object of interest.

In one example, appearance of game environment (e.g., by modifying vertex data, texture data and/or color data based on the input signals) can be altered (i.e., visual perception of the game environment can be affected). In another example, appearance of an object of interest/secondary object (e.g., by modifying vertex data, texture data and/or color data based on the input signals) can be altered (i.e., visual perception of the object of interest/secondary object can be affected). In yet another example, audio accompaniment data such as sound effects data, background music data, soundtrack data and/or timing data can be altered based on input signals (i.e., audio perception can be affected by the input signals). In yet a further example, input signals can be communicated for selecting one or both of object(s) of interest and the secondary object(s), and the selection can be one or both of audibly and visually perceived at the output module 210. Other examples are also useful.

Earlier mentioned, input signals can effectively affect audio output at the output module 210. The manner in which input signals can effectively affect audio output at the output module 210 will now be discussed in further detail.

In an example where the applications module 202 is running a game based application and the application signals can correspond to game data, the processor module 204 can be configured to process audio accompaniment data based on location of the object of interest as it moves. Specifically, the processor module 204 can, for example, be configured to process timing data and sound effects data based on location of the object of interest as it moves. For example, in the bowling game, where the bowling ball has been identified as the object of interest and the bowling ball is moving from a start point to an end point (e.g., rolled from the bowler's position to the location of the bowling pins), timing data and sound effects data can be processed by the processor module 204 such that a "thud" sound effect can be audibly perceived as the bowling ball is dropped at the start point, a "rolling" sound effect can be audibly perceived as the bowling ball rolls towards the bowling pins and a "collision" sound effect can be audibly perceived as the bowling ball collides with the bowling pins. The "thud" sound effect, the "rolling" sound effect and the "collision" sound effect are examples of sound effects data.

Additionally, the start point can be visually perceived to be near the left side of the display portion 316 and the end point can be visually perceived to be near the right side of the display portion 316. Therefore the timing data can be processed such that the "thud" sound effect, "rolling" sound effect and "collision" sound effect are timed such that the "thud" sound effect can be substantially audibly perceived only at the left side of the display portion 316 (i.e., via the left speaker unit) as the bowler is visually perceived to drop the bowling ball, the "rolling" sound effect can be substantially audibly perceived to vary in loudness as the bowling ball is visually perceived to roll from the left side to right side of the display portion 316 (i.e., initially loudest at the left side of the display portion 316 at the start point, gradually reducing loudness at the left side of the display portion 316 as the bowling ball rolls towards the right side of the display portion 316, gradually increasing loudness at the right side of the display portion 316 as the bowling ball approaches the right side of the display portion 316 and finally loudest at the right side of the display portion 316 at the end point) and the "collision" sound effect can be substantially audibly perceived only at the right side of the display portion 316 (i.e., via the right speaker unit) as the bowling pins are visually perceived (i.e., via the display portion 316) to be knocked down by the bowling ball.

In this regard, it is appreciable that the processor module 204 can, in one embodiment, be configured to process the audio accompaniment data (associable with timing data and sound effect(s) data in a manner so as to time sound effect(s) in accordance with visual perception of the object(s) of interest. For example, the "thud" sound effect can be timed such that it is heard when it can be visually perceived that the bowler has dropped the bowling ball and the "collision" sound effect can be timed such that it is heard when it can be visually perceived that the bowling ball collides with the bowling pins.

Further appreciably, the processor module 204 can, in another embodiment, be configured to process the audio accompaniment data in a manner so as to position the sound effect(s) in accordance with visual perception of the object(s) of interest. Specifically, the sound effect(s) can be associated with a location in the game environment (e.g., bowling alley). The "thud" sound effect can be associated with a location at the start point of the game environment (e.g., location of the bowler) and the "collision" sound effect can be associated with a location at the end point of the game environment (e.g., location of the bowling pins). Therefore, the "thud" sound effect can be audibly perceived by a gamer to be emitted from a location which is substantially at the left side of the display portion 316 and the "collision" sound effect can be audibly perceived by a gamer to be emitted from a location which is substantially at the right side of the display portion 316. In this manner, the processor module 204 can be configured to process the audio accompaniment data in a manner so as to allow audio positioning based on object(s) of interest.

Yet further appreciably, the processor module 204 can, in yet another embodiment, be configured to process the audio accompaniment data in a manner so as to vary audio characteristic(s) (e.g., loudness) of the sound effect(s) in accordance with visual perception of the object(s) of interest. For example, the audio characteristic of a sound effect can be loudness of the sound effect. In a more specific example, the loudness of the "rolling" sound effect at the right/left side of the display portion 316 can be varied in accordance with rolling movement of the bowling ball.

In yet a further embodiment, the processor module 204 can be configured to process the audio accompaniment in a manner so as to time sound effect(s) in accordance with visual perception of the object(s) of interest, so as to position the sound effect(s) in accordance with visual perception of the object(s) of interest and/or so as to vary audio characteristic(s) of the sound effect(s) in accordance with visual perception of the object(s) of interest.

Therefore, the processor module 204 can be configured to process the audio accompaniment data in a manner so that sound effect(s) can be audibly perceived in accordance with visual perception of the object(s) of interest. As discussed in the above example, timing of sound effects (e.g., "thud," "rolling," and "collision"), audio characteristic(s) (e.g., loudness) and/or position of the sound effects can be based on visually perceived location/activities (e.g., drop at the start point, rolling from the start point to the end point and collision at the end point) of the object of interest (e.g., bowling ball).

Although the foregoing is described in the context of sound effect(s) data, it is understood that other examples (e.g., background music data, soundtrack data) of audio accompaniment data can equally apply. Furthermore, although the foregoing is described in the context of object(s) of interest, it is understood that other types of data such as scene data and object data in association with secondary objects can equally apply.

In one example, in relation to the scene data, based on the texture data where an object in the game environment can be visually perceived to be shiny, the processor module 204 can be configured to process the audio accompaniment data so that a "glittering"/reverb sound effect/background music/soundtrack can be produced corresponding to the texture data which indicates that the object in the game environment is shiny.

Appreciably, based on the foregoing discussion on how audio accompaniment data can be processed by the processor module 204 (e.g., audio positioning based on object(s) of interest), 3D based audio and/or audio modifications can be made possible.

Appreciably, game data can be associated with object data, scene data and/or audio accompaniment data (i.e., any of the object data, scene data and audio accompaniment data or any combination thereof). Earlier mentioned, the object data can be associated with object description(s) and scene data can be associated with scene description(s). In this regard, the each of the object data, scene data and audio accompaniment data can effectively be a basis for providing a description of the game world (which also can be referred to as application world) which can, for example, be visually and audibly perceived via the output module 210.

Therefore, the applications module 202 can be considered to be capable of (i.e., configurable) generating a description (e.g., a description of the game world where the application being run is a game based application) based on application software or application program (i.e., an application) being run by the applications module 202 and/or input signals communicated from the input module 201. The description generated by the applications module 202 can be communicated from the applications module 202 in the form of the aforementioned application signals.

Moreover, since media stream generated at the transmitter device 200a can be based on application signals (e.g., game data) communicated from the applications module 202, the generated media stream can be associated with a description which can be one or both of visually (i.e., a visual based description) and audibly (i.e., an audio based description) perceived. The description associated with the generated media stream can, effectively, be associated with/based on the description generated by the applications module 202. Earlier mentioned, description (communicable in the form of application signals) generated by the applications module 202 can be based on one or both of the application being run and the input signals.

Specifically, the object data can be based upon to provide a visual based description of, for example, an object of interest (shape, color, texture etc.). The scene data can be based upon to provide a visual based description of the game environment (e.g., bowling alley). The audio accompaniment data can be based upon to provide an audio based description of, for example, movement of an object of interest (e.g., visually perceived movement of the bowling ball from one end of the display portion 316 to another end of the display portion 316).

In this regard, the game data (i.e., corresponding to application signals) can also be referred to as "world context". "World context" can be based upon to provide visual and/or audio based description of the game world. Moreover, earlier mentioned, game data (i.e., application data) can correspond to the application signals and the application signals can effectively be considered to be commands for making appropriate selection(s) from the audio library and/or the graphics library. Therefore, the aforementioned commands can correspond to/referred to as "world context".

Game data (i.e., world context) and/or generated asset(s) can be communicated from the transmitter device 200a to the receiver device 200b. Specifically, game data and/or generated asset(s) can be communicated from the transceiver module 206 to the transceiver portion 212.

The received game data (i.e., received world context) and/or received generated asset(s) can be processed at the receiver device 200b in a manner analogous to the manner in which game data and/or generated asset(s) can be processed at the transmitter device 200a. In this regard, the forgoing discussion pertaining to the processing of game data and/or generated asset(s) at the transmitter device 200a analogously applies to the processing of received game data (i.e., received world context) and/or generated asset(s) at the receiver device 200b.

Therefore, it is appreciable that the received game data (i.e., received world context) can be a basis for producing a replicated media stream (i.e., of the generated media stream at the transmitter device 200a) at the receiver device 200b. Like the media stream generated at the transmitter device 200a, the replicated media stream can be associated with a description (e.g., one or both of visual based description and audio based description). The description of the replicated media stream can correspond to the description of the media stream at the transmitter device 200a.

Moreover, as an option, at the receiver device 200b, input signals can be generated by, for example, a user operating the input portion 220 in a manner so as to manipulate/modify/change any portion/part of the replicated media stream per user preference. Earlier mentioned, input signals can be communicated from the input portion 220 to the processor portion 214. The processor portion 214 can be configured to process the input signals and the received application signals (i.e., received game data/received world context) and, optionally, received asset(s) to produce control signals.

Specifically, visual based description (e.g., object description(s) and/or scene description(s)) and/or audio based description (i.e., audio accompaniment data) of the replicated media stream can be manipulated/modified/changed per user preference.

In the case of object description(s)/scene description(s), vertex data, texture data, shape data and/or color data can be manipulated in a manner so as to change the appearance of, for example, the object of interest/game environment.

In one example, depth information can be added and/or modified. This is particularly useful for two dimensional (2D) objects in the game. Specifically, if the bowling ball (i.e., object of interest) appears to be 2D in the bowling game, it can be useful to include depth information so that the bowling ball can be visually perceived as a 3D object (i.e., 3D bowling ball instead of the original 2D bowling ball in the game). In this regard, artificial 3D objects can be created and/or depth perception can be enhanced.

In another example, shadow information can be added and/or modified. Specifically, shadows can be added to, for example, the object(s) of interest or the original shadow information of the object(s) of interest can be modified. Shadows can, for example, be computed based on shape data (i.e., geometry of, for example, the object(s) of interest) and/or pre-defined light sources. Elaborating, the scene description(s) could include lighting data to indicate one or more light sources in the game environment and shadow information can be computed based in lighting data and shape data of the object(s) of interest. Specifically, in the bowling game, shape data can indicate that the geometric shape of the bowling ball (i.e., object of interest) is spherical and lighting data can indicate that there are some light sources (e.g., ceiling lights, spotlights) in the bowling alley (i.e., game environment). Therefore, shadow information can be computed so that the angle/size etc. of the shadow of the bowling ball can change as it rolls along the bowling lane and based on whether it is rolling towards/away from a light source. In this regard, artificial shadows and/or original shadows of, for example, an object of interest can be created and/or modified to enhance visual perception and/or enhance depth perception.

In yet another example, lighting effects can be added/modified/customized. Specifically, the scene description(s) can include lighting data to indicate one or more light sources in the game environment. The light sources generally are indicative of portions of the game environment that appear to be bright. In this regard, it is appreciable that the game environment can include portions that are dark (e.g., dark corners) where light sources are not available. Therefore, lighting effects can be customized or added so that dark corners in the game environment can become illuminated. Lighting effects can also be modified so as to increase or reduce brightness in bright portions of the game environment.

In yet a further example, customized visuals (which can also be referred to as the aforementioned assets) can be added. Examples of customized visuals (i.e., assets) are visual cues, maps and/or advertisements. In this regard, scene data can be manipulated in a manner so as to include additional customized visuals. The customized visuals can, for example, be visually perceived to be integrated with the game environment.

Visual cues can relate to visual aids to help a gamer (who may be a beginner) to play the game. For example, in the bowling game, visual cues can be in the form of arrows or projected rolling paths of the bowling ball. With the visual cues, a gamer may be able to train and learn how to play the game. A visual cue can be augmented on-screen (e.g., visually perceivable game environment) to show a gamer how to play the game more effectively.

Maps can relate to game maps showing an overview of the game environment. With a game map, a gamer may be able to better appreciate the game and navigate game characters in a more efficient manner while playing the game.

Advertisements can relate to, for example, visual banners advertising product(s) and/or service(s) of, for example, a sponsor (e.g., of the game application).

Other examples are also useful. In one example, based on color data, the color of an object of interest can be changed per user preference. In another example, based on texture data, the texture of an object of interest (i.e., bowling ball) can be changed per user preference (e.g., the surface of the bowling ball, which may originally appear to be shiny, can be replaced with a "sandy" look or "charcoal" look).

In the case of audio accompaniment data, audio positioning and/or 3D based audio can be changed based on a user's position relative to the receiver device 200b. Furthermore, if desired, the audio characteristics (e.g., pitch, tone, loudness) of background music, soundtracks and/or sound effects etc. can also be changed.

Therefore, a user operating the receiver device 200b can be allowed to manipulate one or more portions of the replicated media stream per user preference. More specifically, where the media stream is, for example, a video, a user may be allowed to alter/change/manipulate, for example:

I) the appearance (color, texture, shape, size etc.) of one or more objects (e.g., object of interest) in the video by modifying/changing/manipulating visual based description; and/or II) audio characteristics (pitch, tone, audio positioning etc.) of background music, soundtracks and/or sound effects by modifying/changing/manipulating audio based description.

Appreciably, if one portion of the replicated media stream is manipulated per user preference, the remaining portions can remain unchanged.

For example, in the replicated media stream, the object of interest (e.g., bowling ball) can be visually perceived to be blue in color and the secondary objects (e.g., bowling pins) can be visually perceived to be red in color. The user may wish to only change the color (i.e., based on color data) of the object of interest (i.e., object data) and not the color of the secondary objects. Therefore, the original color (i.e., blue) of the object of interest (i.e., the bowling ball) can be changed to, for example, green (i.e., new color) per user preference while the color of the secondary objects (i.e., the bowling pins) can remain unchanged (i.e., red in color per original).

As an option, manipulation of one or more portions of the replicated media stream per user preference can be by way of replacing one or more original portions of the replicated media stream with corresponding new portions. Remaining portions (i.e., not subjected to replacement per user preference) can remain unchanged.

For example, the replicated media stream can be in relation to the object data being associated with the object of interest (i.e., object data) being the bowling ball and the sound effects data being associated with "glittering"/reverb sound effect for shiny surface (e.g., the bowling ball has a shiny surface). Manipulation of one or more portions of the replicated media stream per user preference can be by way of replacing the bowling ball (original object of interest) with, for example, a bowling pin and the "glittering" (original sound effect) sound effect with another sound effect such as a bird tweeting. In this manner, one or more original portions (e.g., bowling ball/glittering sound effect) of the replicated media stream can be replaced with corresponding new portions (e.g., bowling pin/bird tweeting sound effect) per user preference.

It is appreciable that manipulation of one or more portions of the replicated media stream per user preference at the receiver device 200b should not affect (i.e., should be independent of) the generated media stream at the transmitter device 200a.

For example, where in the generated media stream (at the transmitter device 200a), the visually perceivable color of the object of interest is blue, the visually perceivable color of the object of interest in the replicated media stream (i.e., at the receiver device 200b) should consequently be also blue. If in the replicated media stream, visually perceivable color of the object of interest is subsequently changed from blue (i.e., original color) to green (i.e., new color) per user preference (as discussed in an earlier example), the change in terms of the visually perceivable color of the object of interest in the replicated media stream (at the receiver device 200b) should not affect the visually perceivable color of the object of interest in the generated media stream (at the transmitter device 200a). Specifically, the visually perceivable color of the object of interest in the generated media stream at the transmitter device 200a should remain as blue (i.e., original color) even though there is a change (i.e., from blue to green) in terms of visually perceivable color for the object of interest in the replicated media stream at the receiver device 200b.

In this regard, each of the generated media stream (i.e., at the transmitter device 200a) and the replicated media stream (i.e., at the receiver device 200b) can include one or more details which can be audio based (i.e., audio based description such as sound effect(s) etc.) and/or visual based (i.e., visual based description such as object(s) of interest, secondary object(s) etc.). The one or more details (e.g., of the replicated media stream) can correspond to the aforementioned one or more portions (e.g., of the replicated media stream). Without manipulation per user preference, it is appreciable that the details of the replicated media stream at the receiver device 200b should be similar to, if not substantially the same as, the details of the generated media stream at the transmitter device 200a. With manipulation per user preference (i.e., based on input signals communicated from the input portion 220), it is appreciable that one or more details of the replicated media stream can be changed/altered/manipulated (e.g., per earlier discussed examples regarding manipulation/modification/change in one or both of visual based description and audio based description). Specifically, one or more specific detail(s) (i.e., one or more portions) of the replicated media stream can be changed/altered/manipulated per user preference while the remaining details (i.e., remaining portions) can remain unchanged (i.e., similar/substantially identical to corresponding details of generated media stream).

Earlier mentioned, conventional information sharing techniques to share a video generated at a source to one or more recipients require the source to communicate the video itself to one or more recipients. Communication of the video would require substantial resources (e.g., communication bandwidth) since a video typically has a large data size. Moreover, communication speed may be adversely affected depending on data size of the video.

It is therefore appreciable that for the system 200, by communicating commands (i.e., world context) instead of generated media stream (i.e., from the transmitter device 200a to the receiver device 200b), substantial resources need not be dedicated (as compared to conventional information sharing techniques) by virtue of the reduction in data size that needs to be communicated. Moreover communication speed need not be adversely impacted since communicated commands (i.e., world context) are generally much smaller in data size as compared to the generated media stream. In this regard, efficient communication can be facilitated.

For example, in regard to conventional information sharing techniques, for the purpose of communicating a media stream, it may be required to communicate a graphics file from the graphics library. The graphics file can correspond to, for example, a visually perceivable 640×480 image of a line which is about 300K pixels in terms of data size. In contrast, for the system 200, a command (i.e., world context) corresponding to the image of the line is communicated instead. The communicated command (world context) may only be a few bytes in terms of data size. Therefore, for the system 200, there is need to only communicate a few bytes of data (i.e., world context) instead of 300K pixels (as in conventional information sharing techniques). This facilitates efficient communication (e.g., in terms of substantial reduction in required communication bandwidth and/or communication speed).

Furthermore, in regard to conventional information sharing techniques, there may be a need for a communicated (i.e., shared) video to be stored (e.g., at the recipient side) in order for the communicated video to be properly rendered. Hence substantial resources (e.g., storage space) at the recipient side may be required since the communicated video may be of a large data size. In contrast, for the system 200, resource requirement (e.g., storage space) may not be as burdensome (i.e., with reference to the above example regarding the image of a line, storing a few bytes of command as opposed to having to store 300K pixels).

Moreover, since media stream can be replicated/re-rendered based on communicated commands (i.e., world context), rendering at the receiver device 200b side can be of arbitrary resolution without pixellation.

Additionally, for the system 200, since a user can be allowed to manipulate one or more portions (i.e., one or more details) of the replicated media stream per user preference, user interaction with the replicated media stream (e.g., video) in a user friendly manner can be facilitated.

Figure 4:
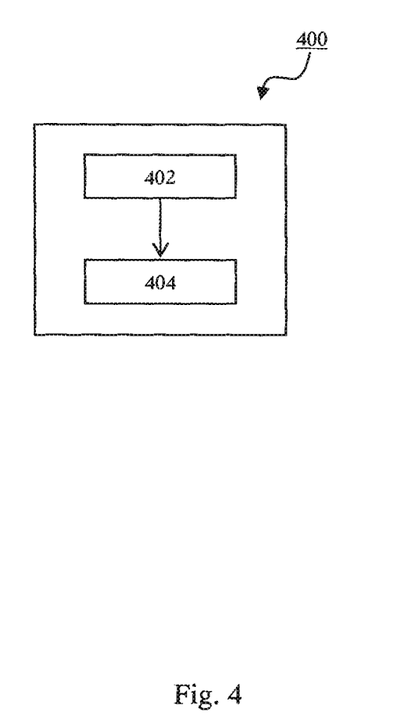
FIG. 4 shows a process flow diagram in relation to a method in association with the system of FIG. 2, in accordance with an embodiment of the disclosure.

FIG. 4 shows a process flow diagram in relation to a method 400 in association with the system 200 in accordance with one embodiment of the disclosure.

Specifically, FIG. 4 shows a method 400 for replicating a media stream generated by the transmitter device 200a. The media stream can, for example, be replicated at the receiver device 200b. Appreciably, the media stream being replicated can be capable of user interaction in addition to being one or both of visually and audibly perceivable. Further appreciably, the replicated media stream can be one or both of visually and audibly perceivable at the receiver device 200b.

The method 400 can include a communication step 402. The communication step 402 can include communicating world context generated at the transmitter device 200a. The generated world context can be communicated from the transmitter device 200a. Specifically, in an example, world context can be generated at the transmitter device 200a and communicated to the receiver device 200b from the transmitter device 200a.

The generated world context can be associated with description generated by the applications module 202 at the transmitter device 200a. Description generated by the applications module 202 can be based on one or both of an application being run (i.e., by the applications module 202) and input signals (i.e., communicated from the input module 201 to the applications module 202). Earlier mentioned, description generated by the applications module 202 can be communicated from the applications module 202 in the form of the aforementioned application signals.

The generated world context can be based upon to generate the media stream. Additionally, the generated media stream can be associated with a description which can be one or both of visually perceived (i.e., visual based description) and audibly perceived (i.e., audio based description). Description of the generated media stream can be associated with/based on description generated by the applications module 202 based on the application being run and/or the input signals.

The method can further include a processing step 404. The processing step 404 can include processing the received world context (e.g., by the processor portion 214) in a manner so as to replicate the media stream generated at the transmitter device 200a. For example, world context communicated from the transmitter device 200a can be received at the receiver device 200b and processed in a manner so as to replicate the media stream.

The replicated media stream at the receiver device 200b can be associated with a description (i.e., one or both of audio based description and visual based description) corresponding to the description of the media stream generated at the transmitter device 200a. Specifically, without manipulation per user preference, it is appreciable that the details of the replicated media stream at the receiver device 200b should be one or both of visually perceivable and audibly perceivable to be similar to, if not substantially the same as, the details of the generated media stream at the transmitter device 200a.

Moreover, the received world context is capable of being further processed in a manner so as to change the description associable with the replicated the media stream. In this manner, user interaction can be facilitated. Specifically, received world context can be processed in a manner so as to allow the aforementioned manipulation of one or more portions of the replicated media stream per user preference. With manipulation per user preference (i.e., based on input signals communicated from the input portion 220), it is appreciable that one or more details of the replicated media stream can be changed/altered/manipulated (e.g., per earlier discussed examples regarding manipulation/modification/change in one or both of visual based description and audio based description). Specifically, one or more specific detail(s) (i.e., one or more portions) of the replicated media stream can be changed/altered/manipulated per user preference while the remaining details (i.e., remaining portions) can remain unchanged (i.e., similar/substantially identical to corresponding details of generated media stream).

Figure 5:
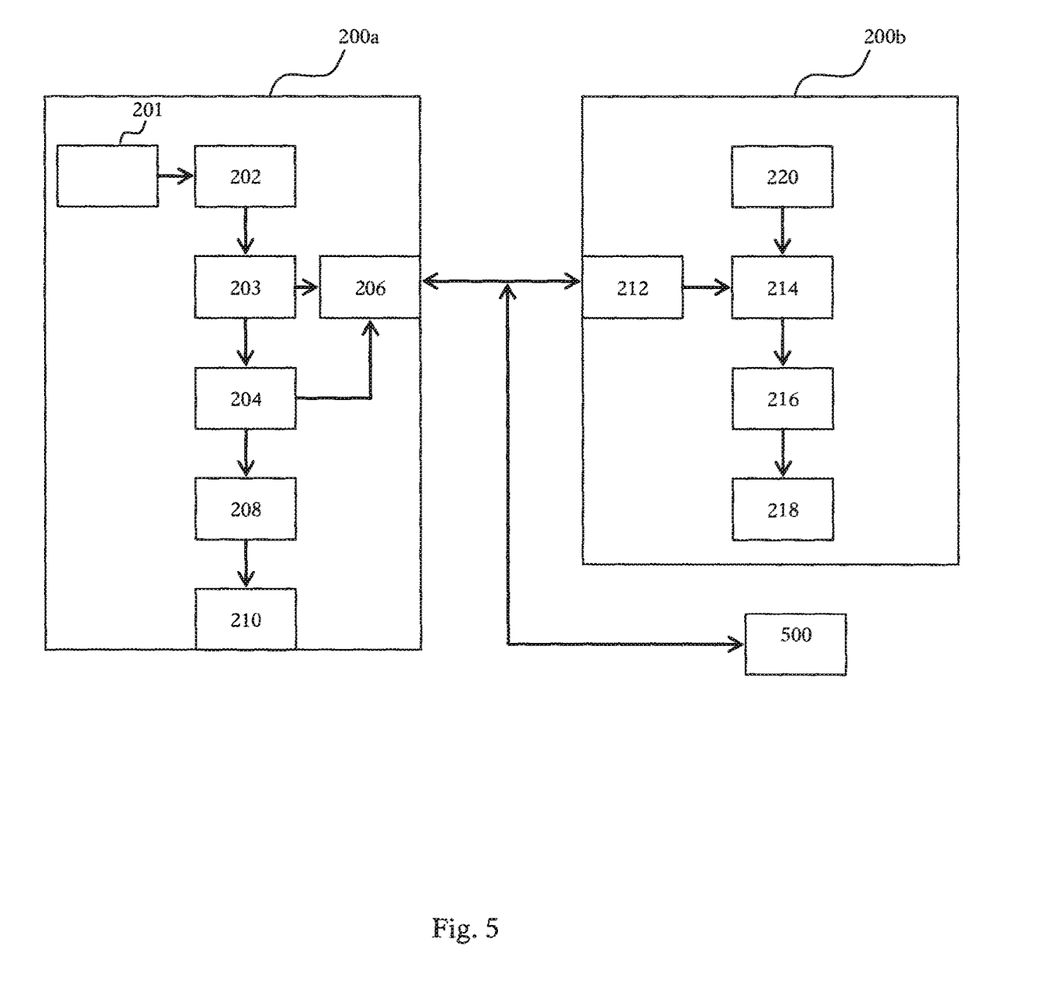
FIG. 5 shows a variation of the system of FIG. 2, in accordance with an embodiment of the disclosure.

FIG. 5 shows a variation of the system 200 in accordance with an embodiment of the disclosure. As shown, the system 200 can, as an option, include a recipient device 500. The recipient device 500 can be coupled to one or both of the transmitter device 200a and the receiver device 200b.

In one embodiment, one or both of the generated media stream (from the transmitter device 200a) and the replicated media stream (from the receiver device 200b) can be communicated to the recipient device 500. The recipient device 500 can include an input device (not shown) and an output device (not shown). The input device can be analogous to the aforementioned input module 201 and input portion 220. In this regard, the input device can be used to generate input signals which can be communicated from the recipient device 500 to one or both of the transmitter device 200a and the receiver device 200b. Additionally, the output device can be analogous to the output module 210 and the output portion 218.

The input signals communicated from the recipient device 500 can be used to manipulate the generated media stream and/or manipulate the replicated media stream. The generated media stream and/or replicated media stream can be manipulated by input signals communicated from the recipient device in a manner analogous to the manipulation of replicated media stream at the receiver device 200b based on input signals generated via the input portion 220 per earlier discussion.

In a more specific example, replicated media stream can be further communicated from the receiver device 200b to the recipient device 500 and input signals can be communicated from the recipient device 500 to the receiver device 200b. In this regard, the replicated media stream can be one or both of visually and audibly perceived at the recipient device 500 via the output device. Input signals can be communicated from recipient device 500 to manipulate the replicated media stream (at the receiver device 200b) in a manner analogous to manipulation of replicated media stream at the receiver device 200b based on input signals generated via the input portion 220 per earlier discussion. Therefore, a manipulated replicated media stream can be generated based on processing by the processor portion 214 of the received world context and input signals communicated from the recipient device 500. The manipulated replicated media stream can be communicated from the receiver device 200b to the recipient device 500. The manipulated replicated media stream can be one or both of visually and audibly perceived at the recipient device 500 via the output device.

This is useful in the case where the recipient device 500 does not possess adequate processing capabilities and would need to rely on the processing capabilities of, for example, the receiver device 200b.

In such a case, user interaction of media stream (generated and/or replicated) can still be made possible for a user using a device (e.g., recipient device 500) with inferior processing capabilities (as compared to the transmitter device 200a and/or the receiver device 200b).

In this regard, the earlier mentioned method 400 of FIG. 4 can, as an option, further include (not shown) further communicating the replicated media stream from the receiver device 200b to the recipient device 500 so that the replicated media stream can be one or both of visually and audibly perceivable at the recipient device 500. The method 400 can, as an option, yet further include (not shown) generating and communicating input signals from the recipient device 500 to the receiver device 200b. Appreciably, the input signals communicated from the recipient device 500 can be used to change the description associable with the replicated media stream.

In the foregoing manner, various embodiments of the disclosure are described for addressing at least one of the foregoing disadvantages. Such embodiments are intended to be encompassed by the following claims, and are not to be limited to specific forms or arrangements of parts so described and it will be apparent to one skilled in the art in view of this disclosure that numerous changes and/or modification can be made, which are also intended to be encompassed by the following claims.

In one example, within the system 200 (e.g., the processor portion 214/driver portion 216), at least one virtual camera model (not shown) can be defined. The virtual camera model can be configured to view a primary scene. The primary scene can, for example, be a game scene (e.g., scene data) showing movement of the object of interest. In this regard, the virtual camera model can be initially positioned to view the primary scene.

Specifically, the virtual camera model, for example, can be positioned to view a primary scene where the bowling ball (i.e., object of interest) is rolled across the bowling lane. It is appreciable that the virtual camera model can be further configured to view a secondary scene instead of the primary scene. In this regard, position of the virtual camera model can be changed from the initial position so as to view the secondary scene. The secondary scene can, for example, be associated with a secondary object. Specifically, the virtual camera model can, for example, be positioned to view a secondary scene where the bowling pins (i.e., secondary object(s)) are located. This is useful where a view from a different perspective is desired. More specifically, a user of the receiver device 200b may wish to only observe how the bowling ball collides with the bowling pins as opposed to observing the entire process of the bowling ball rolling across the bowling lane.

Therefore, with reference to the aforementioned visual based description (of the game world which can also be referred to as application world), in addition to object description(s) and scene description(s), visual based description can be in relation to perspective description(s). Perspective description(s) can relate to, for example, change of view (i.e., perspective) from the primary scene to the secondary scene.

In this regard, the processor portion 214 can be configured to receive and process game data in a manner so as to change position of the virtual camera model. Changing of position of the virtual camera model can be regarded of change in perspective description.

In another example, other options (aside processing per earlier discussion) in terms of processing by the processor module 204 and/or processor portion 214 may be possible.

As one option, translation may be possible. For example, commands (i.e., world context) from the transmitter device 200a can be based on/in the form of an Open Graphics Library based instruction set. The Open Graphics Library based instruction set can be translated to another instruction set such as Web Graphics Library based instruction set for, for example, rendering in a web (i.e., internet) browser at the receiver device 200b (e.g., where the output portion 218 corresponds to a web browser). Translation can be performed, either manually or dynamically, by one or both of the processor module 204 and the processor portion 214.

As another portion, synchronization may be possible. Synchronization can be in relation to time-stamping the generated commands (i.e., world context) so as to synchronize the aforementioned graphics based signals and accompanying audio based signals. Specifically graphics based signals and accompanying audio based signals communicated from transmitter device 200a can be synchronized at the receiver device 200b. This is useful for rendering commands (i.e., world context) with appropriate frame-rate that can be supported at the receiver device 200b. Synchronization can be performed, either manually or dynamically, by one or both of the processor module 204 and the processor portion 214.

As yet another option, encoding/compression may be possible. Encoding/compression can be in relation to reducing amount of data (per frame) communicated from the transmitter device 200a to the receiver device 200b. For example, in terms of encoding, a coding/an encoding scheme such as differential coding can be used. Alternatively, in terms of compression, instructions that can be encoded into compact commands can be rendered. Encoding/compression can be performed, either manually or dynamically, by one or both of the processor module 204 and the processor portion 214.

In yet another example, the system 200 can further include an intermediary server (not shown). The intermediary server can be referred to as a proxy or simply referred to as a server. The transmitter device 200a can be coupled to the receiver device 200*b* via the intermediary server. Specifically, commands (i.e., world context) can be communicated from the transmitter device 200*a* to the intermediary server and from the intermediary server to the receiver device 200*b*. This is useful where it is desired to perform additional transformations/processing of the commands (i.e., world context), maintain a cache (i.e., analogous to a library) of often used commands (i.e., world context) so that there is no need to resend/re-communicate commands (i.e., world context) that are regularly used and/or support for more than one receiver device 200*b*.

As one option, the intermediary server can include a processor (not shown). In this regard, input signals can be generated using, for example, the input portion 220 and can be communicated from the receiver device 200*b* to the intermediary server 200*b*.

In this regard, the input portion 220 can be coupled (not shown) to the transceiver portion 212 for transmitting the input signals from the receiver device 200*b*. Therefore, it is possible for a user to manipulate one or more portions of the replicated media stream per user preference in the manner analogous per description with reference to input signals being communicated from the input portion 220 to the processor portion 214 for processing.

This is useful where it is desired to avoid processing burden to, for example, the processor portion 214 at the receiver device 200*b* side. Specifically, instead of communicating input signals (generated via the input portion 220) to the processor portion 214 so that the processor portion 214 can process the received world context based on the input signals, the input signals can be communicated to the intermediary server's processor so that the intermediary server's processor can process the received world context based on the input signals.

In one exemplary scenario, world context can be communicated from the transmitter device 200*a* to the intermediary server and input signals can be communicated from the receiver device 200*b* to the intermediary server. The intermediary server's processor can be configured to process the received world context based on the input signals to generate processed world context signals. The processed world context signals can correspond to the aforementioned control signals. The processed world context signals can be communicated from the intermediary server to, for example, the receiver device 200*b* for further processing by the driver portion 216. The driver portion 216 can be configured to process the processed world context signals in a manner analogous to control signals communicated from the processor portion 214.

What is claimed is:

1. A method for replicating a media stream generated by a transmitter device, the method comprising:
   communicating world context generated at the transmitter device from the transmitter device directly to a receiver device,
      wherein generated world context is associable with description generated based on an application being run at the transmitter device,
      wherein generated world context is based upon to generate the media stream in a manner such that description of the generated media stream is associable with the description generated based on the application being run; and
   processing the received world context at the receiver device in a manner so as to replicate the media stream generated by the transmitter device at the receiver device,
      wherein the replicated media stream is associable with a description,
      wherein description of the replicated media stream corresponds to the description of the media stream at the transmitter device,
      wherein the received world context is capable of being further processed in a manner so as to change the description associable with the replicated media stream, and
      wherein the transmitter device and the receiver device are configured to playback the corresponding media streams independently of each other.

2. The method as in claim 1,
   wherein the replicated media stream is at least one of visually perceivable and audibly perceivable, and
   wherein in addition to being at least one of visually perceivable and audibly perceivable, the replicated media stream is capable of user interaction, and
   wherein user interaction is facilitated by processing the received world context to change the description associable with the replicated media stream.

3. The method as in claim 1,
   wherein input signals can be generated at the receiver device, and
   wherein the input signals are usable to change the description associable with the replicated media stream.

4. The method as in claim 1,
   wherein input signals can be generated at a recipient device and communicated to the receiver device, and
   wherein the input signals are usable to change the description associable with the replicated media stream.

5. The method as in claim 1,
   wherein the replicated media stream is further communicable from the receiver device to a recipient device so that the replicated media stream is at least one of visually and audibly perceivable at the recipient device,
   wherein the recipient device is configurable to generate and communicate input signals to the receiver device, and
   wherein the input signals are usable to change the description associable with the replicated media stream.

6. The method as in claim 1, wherein the transmitter device and the receiver device are each a media playback device for playing back the corresponding media streams.

7. A method for replicating a media stream generated by a transmitter device having an input module capable of being used by a user to generate transmitter device input signals at the transmitter device, the method comprising:
   running an application at the transmitter device and never at a receiver device to generate application signals from the application based on the generated transmitter device input signals, the application signals corresponding to world context which provides at least one of visual and audio based description of the application being run,
   wherein media stream which is at least one of visually and audibly perceivable at the transmitter device is generated by manner of processing the generated transmitter device input signals via the application being run to produce world context and further processing the world context;
   communicating world context generated at the transmitter device, world context being communicable from the transmitter device directly to the receiver device; and
   processing, at the receiver device, the received world context in a manner so as to replicate the media stream generated at the transmitter device, the replicated media stream being at least one of visually and audibly perceivable at the receiver device, wherein the transmitter device and the receiver device are configured to playback the corresponding media streams independently of each other, wherein user interaction of the received world context is capable of being facilitated by manner of changing at least one of visual and audio based description associable with the replicated media stream, wherein receiver device input signals can be generated at the receiver device, and wherein the receiver device input signals are usable to change the description associable with the replicated media stream.

8. The method as in claim 7, wherein recipient device input signals can be generated at a recipient device and communicated to the receiver device, and wherein the recipient device input signals are usable to change the description associable with the replicated media stream.

9. The method as in claim 7, wherein the replicated media stream is further communicable from the receiver device to a recipient device so that the replicated media stream is at least one of visually and audibly perceivable at the recipient device, wherein the recipient device is configurable to generate and communicate recipient device input signals to the receiver device, and wherein the recipient device input signals are usable to change the description associable with the replicated media stream.

10. The method as in claim 9, wherein the transmitter device, receiver device, and recipient device are each a media playback device for playing back the corresponding media streams.

* * * * *